United States Patent

[11] 3,608,924

| [72] | Inventor | Béla Barényi |
| | | Stuttgart-Vaihingen, Germany |
| [21] | Appl. No. | 742,050 |
| [22] | Filed | July 2, 1968 |
| [45] | Patented | Sept. 28, 1971 |
| [73] | Assignee | Daimler-Benz Aktiengesellschaft |
| | | Stuttgart-Unterturkheim, Germany |
| [32] | Priority | July 5, 1967 |
| [33] | | Germany |
| [31] | | P 16 30 315.4 |

[54] SAFETY FRAME FOR MOTOR VEHICLES, ESPECIALLY FOR PASSENGER MOTOR VEHICLES
5 Claims, 10 Drawing Figs.

| [52] | U.S. Cl. | 280/106 |
| [51] | Int. Cl. | B62d 21/00 |
| [50] | Field of Search | 280/106; 293/91 |

[56] References Cited
UNITED STATES PATENTS

| 2,875,841 | 3/1959 | Henderson | 280/106 X |
| 3,110,518 | 11/1963 | Wessells | 280/106 X |
| 3,131,963 | 5/1964 | Schilberg | 280/106 X |
| 3,409,098 | 11/1968 | Brueder | 280/106 X |
| 3,423,122 | 1/1969 | Wessells | 280/106 X |
| 1,365,593 | 1/1921 | Kraus | 293/91 |
| 1,464,321 | 8/1923 | Koester | 293/91 |
| 2,676,030 | 4/1954 | Sherman | 280/106 |
| 2,701,726 | 2/1955 | Bareny | 280/106 |

*Primary Examiner*—Philip Goodman
*Attorney*—Craig, Antonelli & Hill

ABSTRACT: A safety frame for motor vehicles, particularly for passenger motor vehicles, which comprises crossbearers, lateral bearers extending longitudinally approximately within the wheel track and pronglike frame end members of the vehicle end sections which are spaced from each at a smaller distance than the spacing of the lateral bearers; the pronglike frame end members are supported essentially only at the main crossbearers and extend in a downward direction toward the respective vehicle ends.

PATENTED SEP 28 1971

INVENTOR.
BÉLA BARÉNYI

BY Craig & Antonelli

ATTORNEYS

INVENTOR.
BELA BARENYI

SAFETY FRAME FOR MOTOR VEHICLES, ESPECIALLY FOR PASSENGER MOTOR VEHICLES

The present invention relates to a safety frame motor for vehicles, especially for passenger motor vehicles which comprises crossbearers and lateral bearers disposed approximately in the wheel track, and whose pronglike frame members of the vehicle end parts, arranged from each other at a lesser distance than the lateral bearers, are supported essentially only at the main crossbearers.

Such type of a frame is known already in the prior art, for example, in the German Pat. No. 914,104. A frame with as long as possible a passenger space and with as low as possible a floor which also possesses a great rigidity, is intended to be created by this patent.

Departing from such a frame, the present invention is concerned with the aim to further increase the safety of the frame in that better deformation conditions are created for the vehicle end sections. The present invention essentially consists in that the pronglike frame members of the vehicle end parts are directed downwardly toward the respective vehicle ends. With this type of construction according to the present invention, in which the impact energy occurring during an accident is reduced by deformation work, one obtains the advantage that the deformation work is produced by bending. Additionally, by reason of the downwardly directed pronglike frame members, a moment is produced as a result of the lever arm between the connection at the passenger space and the point of impact during the accident which seeds to lift the passenger space. The possibility is created thereby that the units and aggregates mounted in the vehicle end section do not slide in case of an accident into the passenger space but instead underneath the passenger space.

In order to achieve that an upwardly directed moment always acts on the passenger space also in case of an eccentric impact, provision may be made that the pronglike frame members are arranged at an angle to each other, i.e., nonparallel, as viewed from above. The pronglike members can extend either bent or cranked.

In order to relieve the main crossbearer against twisting and torsion, the pronglike members may be provided with a downwardly extending supporting arm. The arm may have a hat-shaped cross section and may be connected by means of two flanges with the end wall of the vehicle.

The pronglike members can be connected readily detachable with the passenger cell in an extraordinarily advantageous manner.

Accordingly, it is an object of the present invention to provide a safety frame for motor vehicles, especially for passenger motor vehicles, which eliminates by simple means the aforementioned shortcomings and drawbacks encountered in the prior art.

Another object of the present invention resides in a safety frame for passenger motor vehicles which considerably increases the safety by creating better deformation conditions for the vehicle end sections.

A further object of the present invention resides in a safety frame for motor vehicles in which the deformation work, reducing the impact energy, is brought about by bending.

Still a further object of the present invention resides in a safety frame for passenger motor vehicles which is so constructed and arranged that in case of a collision accident, the units mounted in the vehicle end section tend to slide underneath the passenger space.

These and other objects, features, and advantages of the present invention will become more obvious from the following description when taken in connection with the accompanying drawing which shows, for purposes of illustration only, several embodiments in accordance with the present invention, and wherein:

FIG. 3 is a partial cross-sectional view of one embodiment taken along line III—III of FIG. 1 as a mirror image on one side of the center longitudinal axis of the vehicle, while

Figure 1:
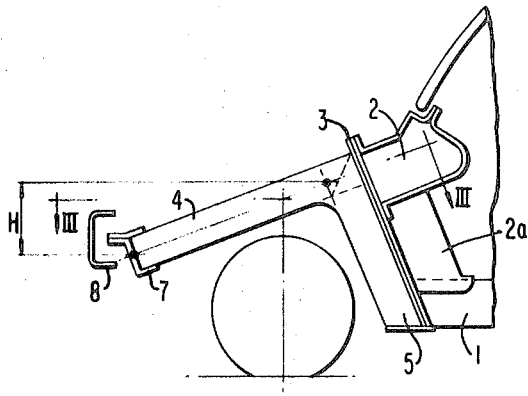
FIG. 1 is a somewhat schematic side elevational view of a first embodiment of a safety frame according to the present invention.

Referring now to the drawing wherein like reference numerals are used throughout the various views to designate like parts, the safety frame according to FIG. 1 consists essentially of lateral bearers 1 disposed approximately within the wheel track and of crossbearers 2, 2a which have a vertical dimension which are defined or delimited by the end wall 3 of the vehicle. The windshield may directly adjoin the main crossbearer member 2.

The pronglike frame members 4 of the vehicle end section are arranged inclined toward the end of the vehicle. The pronglike members 4 are provided in the embodiment of FIG. 1 with arms 5 that are constructed hat shaped in cross section and abut with two flanges 6 at the end wall 3. The pronglike members 4 may be constructed in one piece with the arms 5. If the pronglike members 4 and the arms 5 are to be composed or assembled of two parts, then the connection may be made in the manner as shown in FIG. 1. The two parts may thereby be either mitered or bevelled or in the alternative either the arm 5 or the pronglike member 4 butts against the continuous pronglike member 4 or the continuous arm 5, respectively.

The two pronglike members 4 are provided at the end of the vehicle with transversely disposed profiles or sectional members which in the embodiment consist of a two-partite sectional sheet metal member 7 which is connected in a conventional manner, not illustrated in detail, with the U-shaped profile or sectional member 8 disposed in front thereof.

A lever arm H results with respect to the passenger cell by reason of the inclined arrangement of the pronglike members 4. In case of an accident, the pronglike members 4 are stressed in bending by reason of the occurring impact. A moment occurs thereby which seeks to lift the passenger cell. As a result of this moment, the main crossbearer member 2 is strongly stressed in torsion or twisting which, however, is reduced in the illustrated embodiment by the additional support and bracing of the pronglike members 4 by way of the arms 5.

Figure 2:
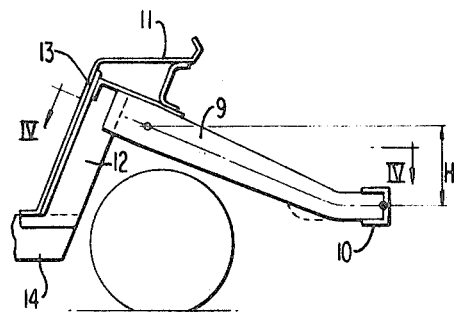
FIG. 2 is a somewhat schematic side elevational view of a second embodiment of a safety frame according to the present invention.

In the embodiment according to FIG. 2, the downwardly inclined, pronglike frame members 9 are angularly bent at their ends in the horizontal direction and are connected with each other by means of a U-shaped profile or sectional member 10. The pronglike members 9 are arranged below the frame main crossbearer 11 and are also supported by means of an arm 12 at the end wall 13 of the vehicle and at the lateral bearers 14. The pronglike members 9 of the vehicle end section possess preferably the same cross section over the entire length thereof and are not matched to the course of the bending movement.

Figure 3:
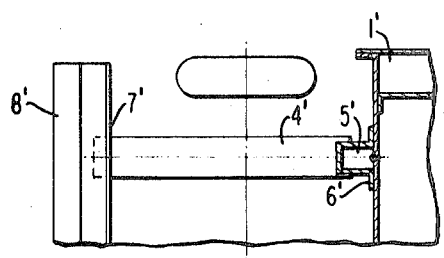
Figure 4:
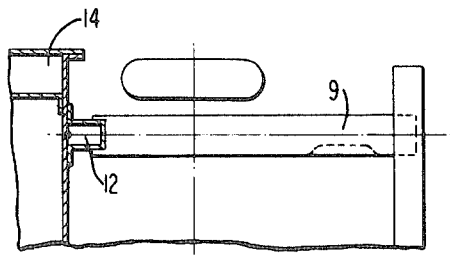
FIGS. 4 and 4a are partial cross-sectional views of two further embodiments of a safety frame according to the present invention, taken along line IV—IV of FIG. 2 and are mirror images on one side of the center longitudinal axis of the vehicle.
Figure 3A:
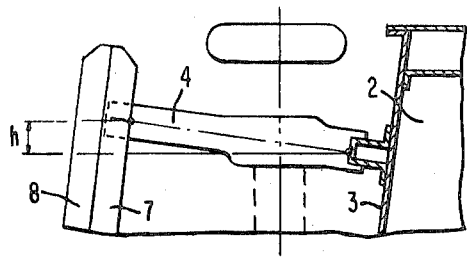
FIG. 3a is a partial cross-sectional view of another embodiment also taken along line III—III of FIG. 1.
Figure 4A:
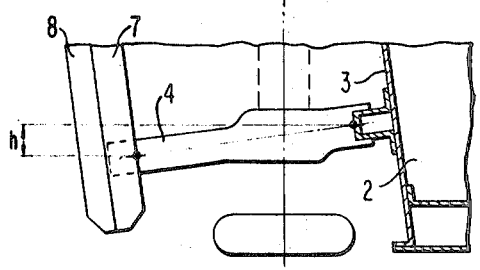

The pronglike members 4' and 9 may, as shown in FIGS. 3 and 4, extend parallel to one another in the vehicle longitudinal direction. As illustrated in FIGS. 3a and 4a, however, provision may also be made that the pronglike members 4 and 9' extend obliquely to the vehicle longitudinal direction, as viewed in plan view, and form in this plane a further lever arm $h$ to the vehicle passenger cell. In the embodiment according to FIG. 3a, the main crossbearer 2 and the end wall 3 of the vehicle have an inclination transversely to the vehicle longitudinal direction. The pronglike members 4 extend in a perpendicular direction from the end wall 3 and the main crossbearer 2 toward the vehicle ends. The connection between the pronglike members 4 takes place by means of profile or sectional members 7 and 8 which extend parallel to the main crossbearer 2 and the end wall 3. The pronglike members 4 have a cranked or offset shape.

However, the pronglike members 9', as shown in FIG. 4a, need not be arranged perpendicularly to the end wall 13' and the crossbearer 11'. If the pronglike members 9' are to receive a lever arm $h$, then preferably provision is made that they are constructed bent or folded whereby the bending place 15 is disposed approximately at the height of the wheel axis 16. Provision may be made thereby that the pronglike members 9' have a further bending place 17.

Figure 5:
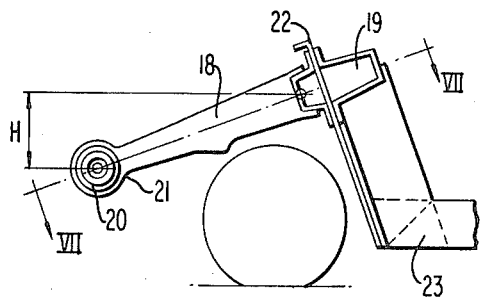
FIG. 5 is a somewhat schematic side elevational view of a still further embodiment of a safety frame according to the present invention, similar to FIG. 1.

In the embodiment according to FIG. 5, the pronglike members 18 are secured, without further support by way of an arm, directly at the main crossbearer 19. Their connection with each other takes place by a tubular member 20 which extends through the ends of the pronglike members 18 constructed as eyes. The main crossbearer 19 is constructed in this embodiment of two parts. The end wall 22 is enclosed between the two parts of the main crossbearer 19. The lateral bearers 23 may be constructed in one piece. However, it will be appropriate for manufacturing reasons to assemble the lateral bearers 23 from two parts whereby the connection can take place in such a manner that either both parts are provided with bevel or miter cuts or that one part extends uninterruptedly, and the other part is secured at the one part by means of a butt joint extending parallel to the former.

Figure 6:
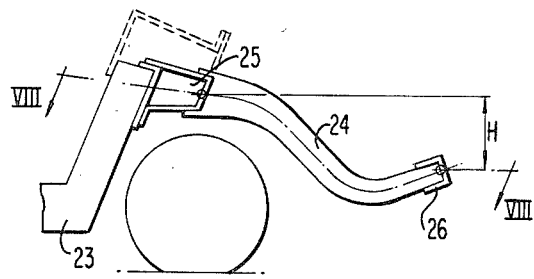
FIG. 6 is a somewhat schematic side elevational view of still another modified embodiment of a safety frame according to the present invention, similar to FIG. 2.
Figure 7:
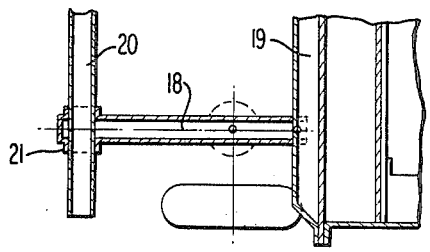
FIG. 7 is a partial cross-sectional view taken along line VII—VII of FIG. 5 and is a mirror image on one side of the center longitudinal axis of the vehicle.
Figure 8:
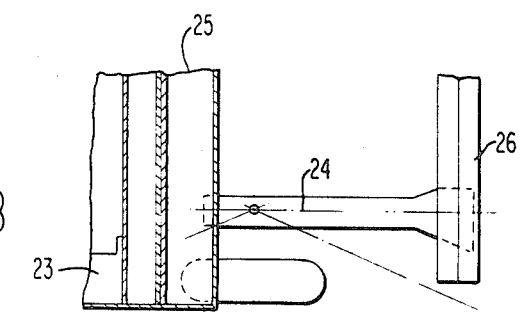
FIG. 8 is a partial cross-sectional view taken along line VIII—VIII of FIG. 6 and is a mirror image on one side of the center longitudinal axis of the vehicle.

In the embodiment of FIG. 6, the pronglike members 24 are also secured only at the main crossbearers 25. The pronglike members 24, connected with each other by means of a U-shaped profile or sectional member 26, have a curved configuration which is already matched approximately to the deformation occurring during an accident.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A safety frame for motor vehicles, especially passenger motor vehicles, which includes crossbearer means, lateral bearers disposed longitudinally approximately within the wheel track and joined to one another at their ends by the crossbearer means, and pronglike members for the front and rear vehicle end sections arranged at a smaller spacing from each other in a respective end section of the vehicle than the spacing between the lateral bearers and supported essentially only at the crossbearer means above the lateral bearers so as to be directed downwardly toward the respective vehicle ends, characterized in that each of the pronglike members is detachably connected at the crossbearers by flange means and is arranged at an angle to each other as viewed from above vehicle, in opposition to the adjacent pronglike member in the respective end section of the vehicle.

2. A safety frame according to claim 1, wherein the crossbearer is arranged at an angle to the longitudinal direction of the vehicle.

3. A safety frame according to claim 1, wherein the flange means includes downwardly extended support arm means resting at the front wall and having an essentially hat-shaped cross section.

4. A safety frame according to claim 3, wherein the crossbearer is arranged at an angle to the longitudinal direction of the vehicle.

5. A safety frame according to claim 4, wherein the pronglike members are offset as viewed from above.